(No Model.)
H. WECKER.
CARRIAGE AXLE.
No. 480,798. Patented Aug. 16, 1892.
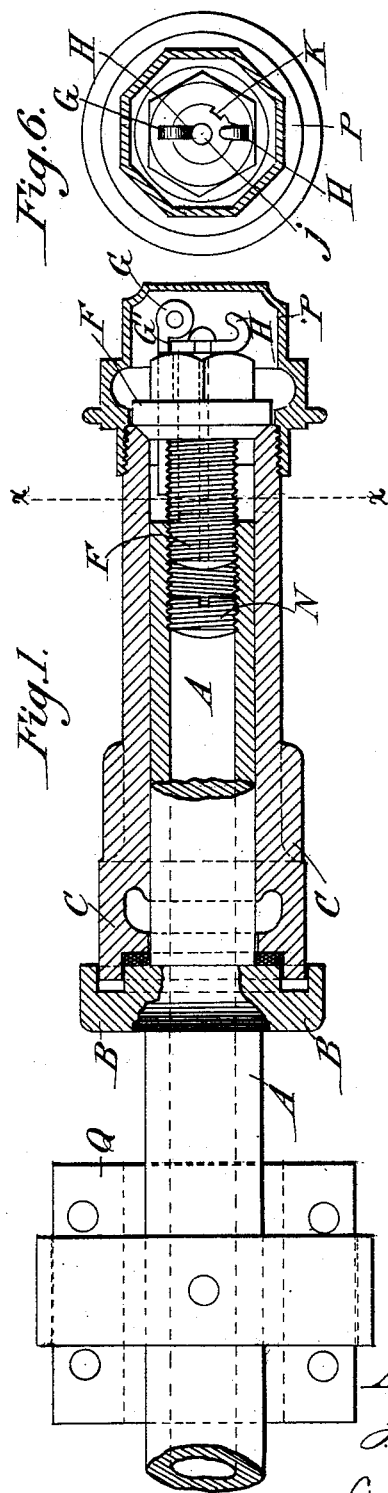
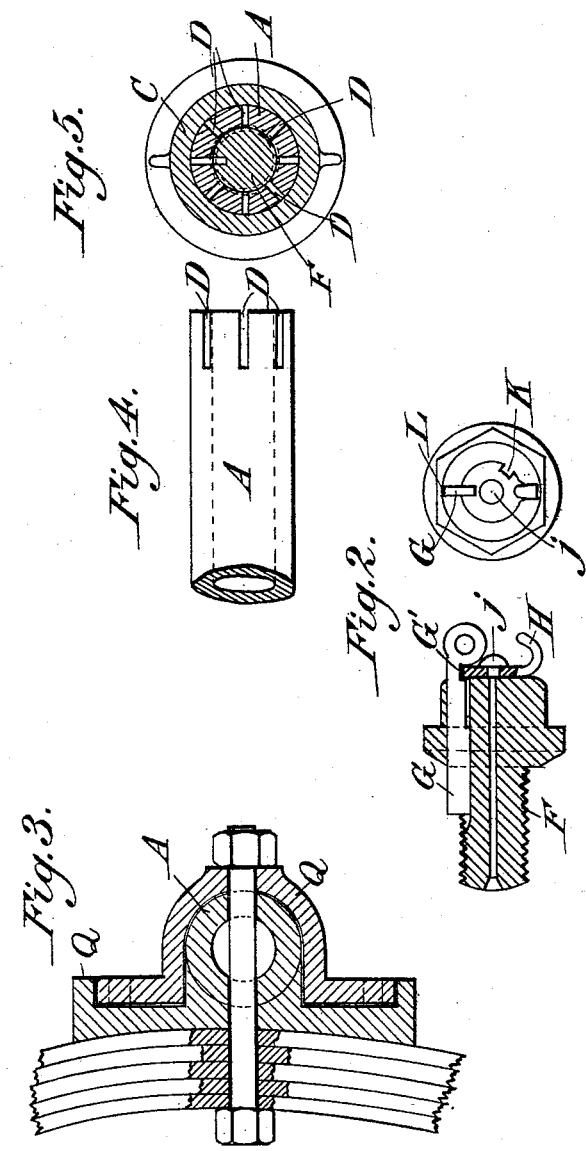
Attest:
F. H. Schott
A. M. Parkins
Inventor:
H. Wecker,
by Cunnie & Goldsborough
Attys.

UNITED STATES PATENT OFFICE.

HENRY WECKER, OF OFFENBACH-ON-THE-MAIN, GERMANY.

CARRIAGE-AXLE.

SPECIFICATION forming part of Letters Patent No. 480,798, dated August 16, 1892.

Application filed March 24, 1892. Serial No. 426,325. (No model.)

*To all whom it may concern:*

Be it known that I, HENRY WECKER, a subject of the Emperor of Germany, and a resident of Offenbach-on-the-Main, in the Grand Duchy of Hesse, Germany, have invented new and useful Improvements in Axles for Carriages, of which the following is a specification.

This invention relates to axles for vehicles, and also to means for securing axle-boxes thereon.

The improved axle is made of tubular steel or iron rolled by the Mannesmann process, and may be tubular throughout, since the strength of tubes so rolled will enable the axle to be made tubular with a reduction of weight without loss of strength, as against solid axles, or only the spindles at the ends of the axle may be made tubular. A collar is firmly secured on the axle at the base of the spindle, and forms an end-thrust block for the axle-box, which is made tubular in one piece, and accurately fits on the spindle, which is tapered slightly from its base to its outer end, as is usually done. The spindle is screw-threaded internally from its outer end inwardly to a suitable distance and is also provided with slots open at their outer ends and extending parallel to the axis to a comparatively slight distance from the end of the spindle, for a purpose hereinafter described. The axle-box is locked on the spindle by a screw-threaded bolt, which takes into the end of the spindle and engages in the internal screw-threads therein. As a part of this bolt is a collar conically beveled on its inner face, so as to abut against the similarly beveled outer end of the axle box or sleeve before mentioned and form the other end-thrust block for the axle-box. In the screw-threaded bolt is cut a longitudinal slot, in which slides a feather or key, near the outer end of which, on its side nearest the axis of the bolt, is a lateral recess. On the center of the head of the bolt is pivoted a small locking-plate for this key, the plate engaging in the lateral recess in the key when fully thrust in and preventing the key from moving endwise unless the locking-plate is turned so that a lateral recess therein coincides with the proximate edge of the key, whereupon the key may be moved endwise. After the bolt is screwed in the key is thrust in and engages in one of the aforesaid slots in the end of the axle-spindle, so as to lock the bolt to the axle. When the key is thus thrust in, the recess in the key will be in the plane of the locking-plate, which may be then turned to lock the key, as aforesaid. The head of the bolt and parts relating thereto may be covered in and inclosed by a cap screwed upon the end of the axle-box sleeve.

The manner of carrying this invention into practice will be apparent from the annexed drawings and following description.

In the drawings, Figure 1 is a longitudinal section and partial side elevation of the end portion of the improved axle with its box and locking devices. Fig. 2 is a longitudinal section and also an end elevation of the locking-bolt. Fig. 3 illustrates the manner of securing the axle to the springs. Fig. 4 is a view of the end of the spindle of the axle in side elevation. Fig. 5 is a cross-section on the line *x x*, Fig. 1. Fig. 6 is an end elevation, the cap-piece being shown in section.

A is the tubular axle, shown in this instance as tubular throughout. It may be fastened to the springs by a bolt passing through it and through a base socket and cover Q, embracing the axle, as shown in Fig. 3.

B is the collar fast on the axle A.

C is the sleeve or axle-box.

F is the locking-bolt with the slot or passage L.

G is the key with lateral recess G', and H is the rotary locking-plate with lateral recess K, and pivoted on a central pin *j*.

P is the cap.

N is a filling-block, which may be screwed into the end of the hollow axle A before the bolt F is inserted, this block being intended to serve as a plug to prevent dirt or oil, &c., from passing into the interior of the axle.

D are the slots in the end of the axle A, into one of which the key G engages to lock the bolt F.

Having thus described my invention, what I claim, and desire to secure by Letters Patent, is—

1. The combination, with an axle having a collar and having its outer end extending beyond the outer end of the spindle mounted thereon, and having an internally-screw-threaded spindle, of an axle-box mounted on the spindle and abutting at its inner end against the collar, and a screw-threaded pin engaging the internally-screw-threaded spindle and having a head bearing against the outer end of the axle-box, substantially as described.

2. The combination, with an axle having a collar mounted thereon and having an internally-screw-threaded spindle, of an axle-box mounted on the spindle and abutting at its inner end against the collar, and a screw-threaded pin engaging the internally-screw-threaded spindle and having a head bearing against the outer end of the axle-box, and means for locking the screw-threaded pin against disengagement, substantially as described.

3. The combination, with an axle having a collar mounted thereon and having an internally-screw-threaded spindle, of an axle-box mounted on the spindle and abutting at its inner end against the collar, and a screw-threaded pin engaging the internally-screw-threaded spindle, and having a beveled head bearing against the beveled outer end of the axle-box, substantially as described.

4. The combination, with an axle having its spindle tubular and screw-threaded in the interior and provided with slots D, of a locking-bolt F, having a feather or key G, with lateral recess G', and a pivoted locking-plate H, with lateral recess K, for the purposes set forth.

5. The combination, with an axle having a hollow spindle, of an axle-box, a retaining-pin engaging within the hollow spindle, and a filling-nut beyond the pin for preventing the passage of dirt, &c., into the axle beyond, substantially as described.

6. The combination, with an axle, of springs resting thereon, a base and cap-piece through which the axle passes, a bolt passing through the springs, base, and cap-piece, and axle, and a nut for drawing up the bolt, so as to clamp all the parts together, substantially as described.

In testimony whereof I have signed my name to this specification in the presence of two subscribing witnesses.

HENRY WECKER.

Witnesses:
FRIEDRICH QUEHL,
FRIEDRICH CORRELL.